United States Patent [19]
Carlsten

[11] Patent Number: 6,014,387
[45] Date of Patent: Jan. 11, 2000

[54] STABLE OPERATING REGIME FOR TRAVELING WAVE DEVICES

[75] Inventor: Bruce E. Carlsten, Los Alamos, N.Mex.

[73] Assignee: Regents of the University of California, Los Alamos, N.Mex.

[21] Appl. No.: 08/915,233

[22] Filed: Aug. 20, 1997

Related U.S. Application Data

[60] Provisional application No. 60/025,857, Sep. 9, 1996.

[51] Int. Cl.$^7$ ........................................................ H01S 3/00
[52] U.S. Cl. ................................................. 372/2; 372/37
[58] Field of Search ............................................. 372/2, 37

[56] References Cited

U.S. PATENT DOCUMENTS 5,280,490  1/1994  Conde et al. .

OTHER PUBLICATIONS

W. L. Menninger, B. G. Danly, and R. J. Temkin, "Autophase Cyclotron Autoresonance maser Amplifiers," Phys. Flluid B 4 (5), pp. 1077–1080, May 1992.

H. Takeda, S. Segall, P. Diament, and A. Luccio, "Stable Off–Axis Electgron Orbits and Their Radiation Spectrum in a Helical Wiggler," Nuclear Instruments and Methods in Physics Research, A237, pp. 145–153, 1985, No month.

*Primary Examiner*—Rodney Bovernick
*Assistant Examiner*—Robert E. Wise
*Attorney, Agent, or Firm*—Ray G. Wilson

[57]  ABSTRACT

Autophase stability is provided for a traveling wave device (TWD) electron beam for amplifying an RF electromagnetic wave in walls defining a waveguide for said electromagnetic wave. An off-axis electron beam is generated at a selected energy and has an energy noise inherently arising from electron gun. The off-axis electron beam is introduced into the waveguide. The off-axis electron beam is introduced into the waveguide at a second radius. The waveguide structure is designed to obtain a selected detuning of the electron beam. The off-axis electron beam has a velocity and the second radius to place the electron beam at a selected distance from the walls defining the waveguide, wherein changes in a density of the electron beam due to the RF electromagnetic wave are independent of the energy of the electron beam to provide a concomitant stable operating regime relative to the energy noise.

9 Claims, 6 Drawing Sheets

STABLE OPERATING REGIME FOR TRAVELING WAVE DEVICES

RELATED CASES

This application claims the benefit of the filing date of U.S. provisional application S. No. 60/025,857, filed Sep. 9, 1996. +gi This invention was made with government support under Contract No. W-7405-ENG-36 awarded by the U.S. Department of Energy. The government has certain rights in the invention.

BACKGROUND OF THE INVENTION

This invention relates to traveling wave devices, and more particularly, to stable operating regimes for high power traveling wave devices.

The free-electron laser (FEL) and the traveling-wave tube (TWT) are both traveling wave devices (TWDs) in which a traveling radio frequency (RF) wave is in synchronism with an electron beam and exponentially extracts power from the electron beam. In a FEL, the RF wave travels faster than the electrons, but the synchronism is established either by wiggling the electrons (in a standard FEL) or by wiggling the RF (in an axial free-electron laser). In a TWT, the RF wave is slowed down in a "slow-wave structure," and no wiggling is required to establish synchronism.

Free-electron lasers (FELs) have demonstrated both high beam-to-radio-frequency (RF) power extraction efficiencies (~30%) and high output power (on the order of gigawatts), and have been considered as candidates to drive high-frequency advanced accelerators like those proposed for linear colliders. However, poor phase stability has been measured for FELs. Typical accelerator applications require RF phase stability on the order of 5° of phase, and advanced accelerator applications, such as bunch compression and short-wavelength FELs, require stability to 1° or less. At low frequencies, klystrons can meet these requirements, which is one reason they are used so extensively for driving accelerators.

Phase noise in microwave FELs arises from fluctuations in tube voltage, current, confining magnetic field strength, and other tube parameters. Typically, the largest effect is from voltage fluctuations. Electron beams for practical FELs used as RF sources will have diode voltages of ½ to 1 MV with voltage stabilities on the order of ¼%. Measured and simulated FEL phase stability to date, which has all been done at high frequencies, has been on the order of 20° to 40° shift per percent voltage fluctuation. This level of phase stability does not satisfy advanced accelerator requirements.

The magnitude of the phase dependency on the beam voltage is easily understood by considering how the output phase is related to the transit time of the electron beam as it travels through the microwave device. In addition, for an FEL, the growing mode's phase velocity depends on several other factors that are dependent on the beam voltage, such as current, plasma frequency, and interaction strength between the electrons and the RF field.

It has been shown for cyclotron autoresonance maser (CARM) amplifiers that it is possible to introduce a correlation in the transverse motion of the electrons with respect to the beam voltage by using a bifilar helical wiggler. The interaction strength is then a function of beam voltage, and it is possible to design the device such that phase variations due to changes in the beam's transit time effectively cancel variations in the phase due to changes in the interaction strength as the beam voltage fluctuates. The proper correlation has been analyzed for the case of negligible space charge forces for a CARM amplifier. This phenomena was named autophase stability.

It is not always easy or convenient to provide a correlation of the interaction strength that will provide autophase stability, particularly for non-CARM interactions. For example, the interaction strength of most TWDs using mildly relativistic electron beams with constant perveance guns has only a weak dependence on the beam voltage. However, in accordance with the present invention, it is relatively easy to generate a correlation with the space-charge wave of the beam that will provide autophase stability simply by detuning the nominal beam energy away from synchronism for interaction strengths that are even independent of the beam voltage. For typical interaction strength dependencies on the beam voltage, low-energy TWDs can be made phase stable, both in the low- and high-gain regimes.

Practical FEL RF sources for linear collider applications need to produce at least several hundreds of megawatts of RF power. In order to accomplish this, the electron beam needs to contain several kiloamperes of current and must be annular to prevent exceeding the space-charge limiting current. In another aspect of the present invention, an off-axis or annular electron beam for a Raman-region FEL introduces the ability to control the reduced plasma frequency of the beam by decreasing the beam wall spacing, thereby shunting the beam's space-charge field to the beam pipe wall and increasing the so-called "plasma reduction factor."

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, this invention may comprise a method for providing autophase stability for a traveling wave device (TWD) electron beam for amplifying an RF electromagnetic wave in walls defining a waveguide having a first radius for the electromagnetic wave. An off-axis electron beam is generated at a selected energy and has an energy noise inherently arising from an electron gun. A RF electromagnetic wave is introduced into the waveguide. The off-axis electron beam is introduced into the waveguide at a second radius. The waveguide structure is provided to obtain a selected detuning of the electron beam. The off-axis electron beam is provided with a velocity and with the second radius to place the electron beam at a selected distance from the walls defining the waveguide structure, wherein changes in a density of the electron beam due to the RF electromagnetic wave are independent of the energy of the electron beam to provide a concomitant stable operating regime relative to the energy noise.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
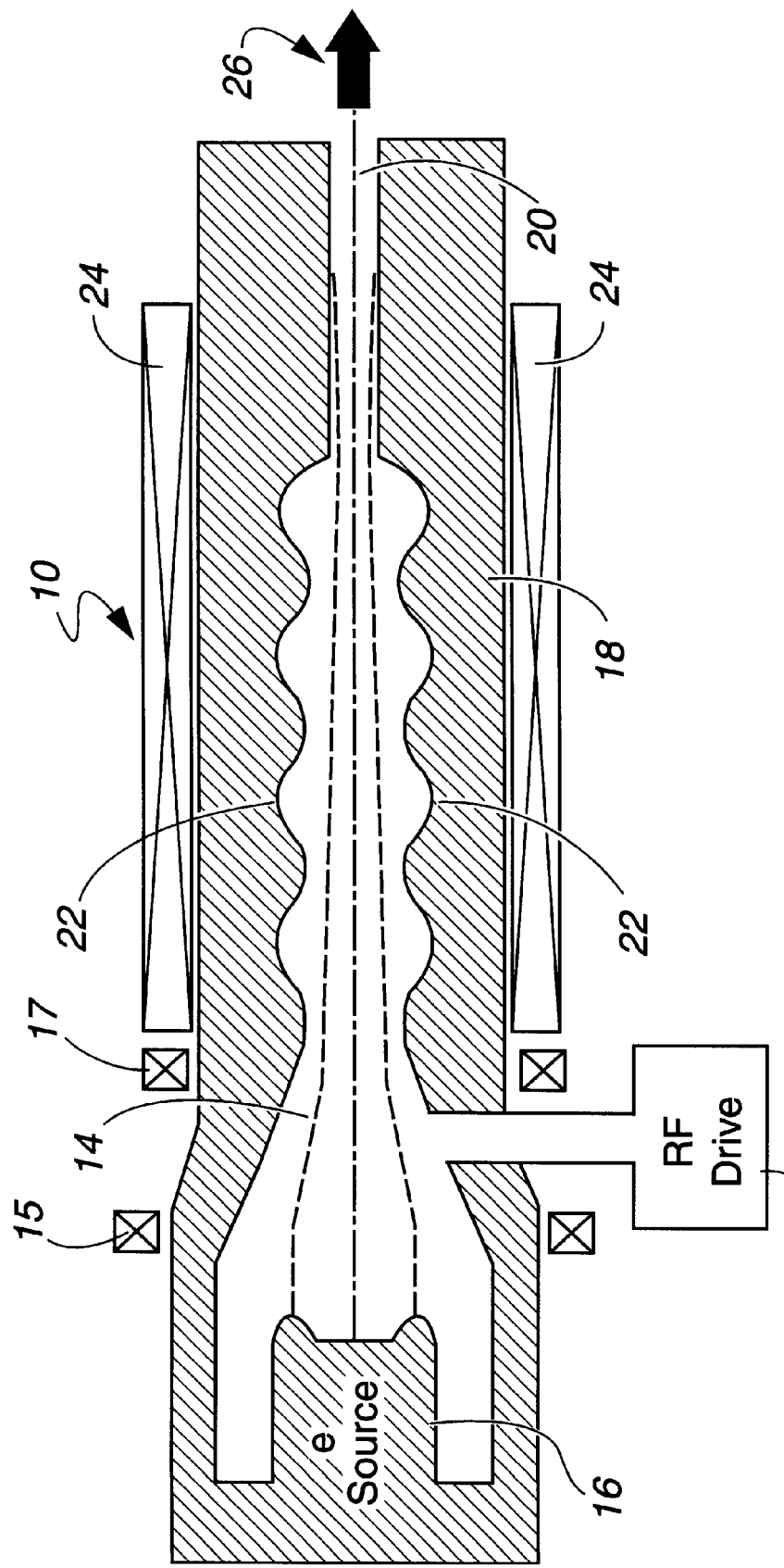
FIG. 1 is a pictorial illustration in cross-section for a traveling wave device according to one embodiment of the present invention.

In accordance with the present invention, it is shown that, in the Raman regime, a correlation between the interaction strength (interaction of an off-axis electron beam having a constant radial position and a rippled RF wave) and an electron beam velocity is not needed to find a first-order phase and gain stable operating condition. In general, an electron beam detuning can be found for a Raman-regime TWD that will lead to phase stability for an arbitrary correlation of the interaction strength with beam velocity by introducing the effect of the space-charge wave, i.e., an autophase condition. The gain of the autophase stable condition can be kept large by proper manipulation of the plasma reduction factor which is only possible if the electron beam is off-axis and near the beam pipe wall. As used herein, the term "off-axis" means an electron beam that is radially displaced from the centerline of the TWD, where the electron beam is a single beam or is an annular beam. These effects are demonstrated with numerical solutions of the dispersion relation.

A traveling wave device (TWD) is operated in a phase stable regime using a combination of detuning and a correlation in the beam's space-charge wave where the dependence of the strength of the electron beam/RF interaction on the beam velocity is small in both the low-gain and high gain regions. The effect of the space-charge wave and the transit time of the electron beam are not separable in a TWD as they are in a klystron. This introduces new physical effects, one of which uses fluctuations in the space-charge wave to counter fluctuations in the beam's transit time through the device.

Phase noise can originate from variations in the mode propagation constant during the small-signal part of the tube. Assume that the mode has a jωt−Γz exponential behavior, where the real part of the mode propagation constant Γ represents the growth (or attenuation) of the RF mode and the imaginary part represents the phase evolution. For sufficiently narrow-bandwidth drive sources it is assumed that there is no variation in ω during the small-signal exponential growth and the only source of phase variation comes from $$\frac{d}{dv_0}\text{Im}(\Gamma) \neq 0 \tag{1}$$

where $v_o$ is the beam's axial velocity.

U.S. Pat. application Ser. No. 08/626,661, filed Apr. 2, 1996, and incorporated herein by reference, describes an FEL, an exemplary TWD, with an axial interaction between an off-axis electron beam and an injected RF field for the generation of gigawatt microwave radiation. In this exemplary FEL device 10, shown in FIG. 1, electron beam source 16 generates an off-axis electron beam 14, which may be an annular beam, that is introduced axially along waveguide 18 for interaction with an electrical field introduced by RF drive 12. The spacing between electron beam 14 and the walls of waveguide 18 is shown below to be one parameter available for operating in a stable regime. Focusing magnets 15 and 17 are conventionally provided for directing an off-axis or annular beam within waveguide 18. The radius of beam 14 from axis 20 is adjusted by adjusting the currents in focusing coils 15, 17 with concomitant control of the spacing between electron beam 14 and the walls of waveguide 18.

Waveguide 18 is provided with rippled wall 22, i.e., a smoothly varying wall radius, with a resulting ripple in the radial position of a null in the axial field, i.e., a radial wiggle in the axial electric field, as more particularly discussed with reference to FIG. 2. The average radius of wall 22 may taper along axis 20. The electron beam velocity is less than the phase velocity of the electric field so that the electric field "slips" by along the electron beam 14. Electron beam 14 then sees a gradient in the axial electric field at the beam location from the radial wiggling of the axial electric field. Solenoid magnet 24 produces an axial magnetic guide field to constrain the electrons in electron beam 14 to move axially at a constant radius within waveguide 18. The radial wiggling of the axial electric field, along with the phase slippage, provides a net interaction between the axial electric field of the RF mode and the axial velocity of off-axis electron beam 14. The RF mode in the waveguide is amplified by this interaction. After the interaction, the axial magnetic field decreases and the electron beam is intercepted by the wall of waveguide 18. Amplified RF 26 propagates out the end of waveguide 18 to a desired application.

Figure 2:
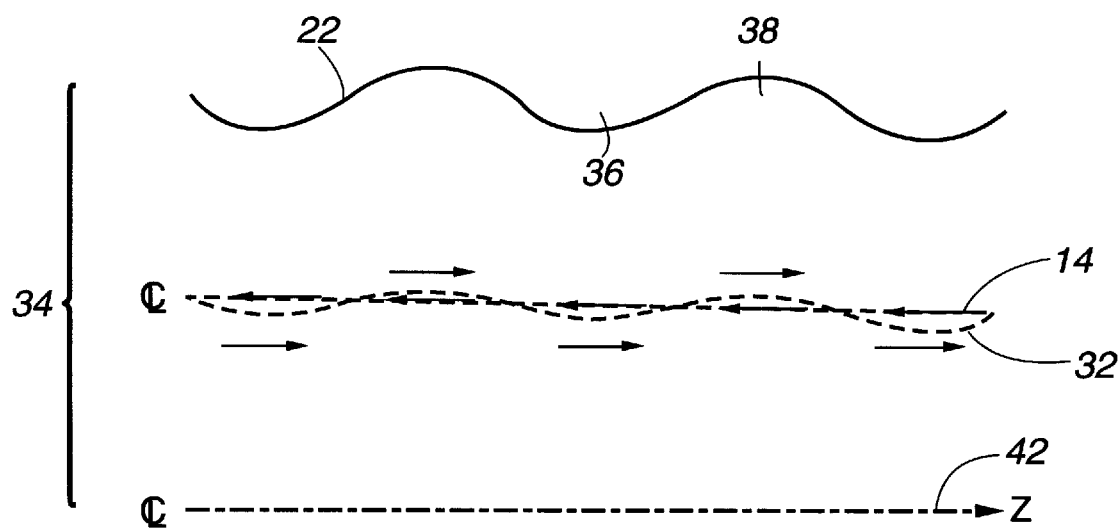
FIG. 2 schematically depicts the relationship between an electron beam, RF axial electric field and a waveguide according to one aspect of the present invention.

As further shown in FIG. 2, an annular electron beam 14 interacts with the axial electric field 32 of a $TM_{On}$ mode in a circular waveguide 18 (FIG. 1). The radius 34 of waveguide wall 22 is periodically rippled, which causes the RF mode to expand and contract radially. The ripple amplitude is only a few percent of the average radius, and the mode is able to conform adiabatically to the gradual change in waveguide radius 34.

The axial FEL interaction for a synchronous particle is shown also in FIG. 2. Annular electron beam 14 is located at a radius corresponding to a zero of the axial electric field 32 of the RF mode propagating within waveguide walls 22 having a mean radius 34. When an electron is at an axial position 36, corresponding to a smallest waveguide radius, the axial electric field at the location of the electron opposes the motion of the electron. As the electron travels to a region of larger radius the RF slips by the electron. When the electron is at a location corresponding to a next maximum waveguide radius 38, one half of a RF wavelength has slipped by, resulting in a sign change in the fields of the propagating mode. Additionally, the electron is experiencing the electric field at a radius larger than the axial field null instead of at a smaller radius. The switch of the null 32 of the axial electric field from one side of electron beam 14 to the other provides another sign change in the axial field at the location of the electron, and the electric field is again opposing the electron's motion.

This interaction is equivalent to the interaction of a transverse-coupling FEL except the RF field is wiggled instead of the electrons to provide synchronism. This interaction is with the RF field fast wave, and is not a slow-wave interaction. This axial interaction is adopted for the following phase-stability analysis instead of the more common transverse-coupling FEL interaction, because the transverse wiggle velocity is typically a complicated function of beam voltage in an FEL using a helical wiggler, which would unnecessarily complicate the analysis. But the conclusions apply to both types of interactions, as well as for traveling wave tubes.

When the equations of motion are averaged over a wiggler period (small-gain assumption), the equation of motion become functionally identical to those for a traveling-wave tube (TWT). This averaging is a standard approximation for deriving the dispersion relation for the Raman regime. The only analytical differences between an axial FEL and a TWT are in the definition for the effective circuit impedance so that the following analysis applies generally to TWDs. As a result, this phase-stability scheme applies equally well to traveling-wave tubes and transversely wiggling FELs with off-axis electron beams as to the axial FEL with an off-axis electron beam used for the following analysis. The only differences are in some minor identifications of a few of the variables used to describe the gain of the device; in practice, this phase-stability scheme is implemented in identical manners, i.e., by adjusting the beam-wall spacing and the reduced mode phase velocity (either through the rf ripple period, the electron beam wiggle period, or the traveling-wave slow wave structure).

Standard microwave notation is used in this analysis, which differs slightly from conventional FEL notation. The reference to beam RF parameters (current, density, velocity) is to electron beam parameters that vary at the RF frequency. The analysis assumes that the beam RF current and velocity and the traveling RF wave amplitude all have the same time and axial functional form, $e^{j\omega t - \Gamma z}$, where $\omega$ is the RF frequency, $t$ is time, $\Gamma$ is the growth of RF quantities (current, density, electric field, RF velocity), and $z$ is the axial position along the RF beam, with the exception that the RF wave also has a phase slippage. A relationship exists between the beam RF density and the wave amplitude from both the Lorentz force equation and the RF wave equation. Setting the ratios equal, there is a quartic equation for $\Gamma$, known as the dispersion relation. $\Gamma$ is in general complex, with the real part corresponding to a growing (or decaying wave) and the imaginary part corresponding to the mode phase shift per unit length.

For most combinations of parameters, all four roots of the dispersion relation lead to purely imaginary $\Gamma$; thus, there is no growing mode. However, close to resonance, two solutions appear that have real parts. For this case the four solutions correspond to (1) a constant-amplitude backward traveling wave (which is not excited if the TWD device output port is properly matched to the output load), (2) a constant-amplitude wave traveling faster than the electrons, (3) a decaying wave traveling slower than the electrons, and (4) a growing wave traveling slower than the electrons. Wave (4) is the one involved in the electron beam interaction. Note that the initial boundary conditions are some input RF power, zero RF beam current, and zero RF beam velocity. These boundary conditions are satisfied if the initial RF voltage is split evenly between waves (2), (3) and (4), assuming wave (1) is not excited. Thus, the initial power in the desired wave is only ⅑ of the input power, and a plot of power versus position along the device shows a −9.54 dB drop in the power right at the RF injection, characteristic of all forward traveling-wave devices.

Assume that the RF current density i, RF axial velocity v, RF beam density ρ, and the axial electric field E at the beam's location can be written in the form $$i_\tau = i_o + i e^{j\omega t - \Gamma z},$$

$$v_\tau = v_o + v e^{j\omega t - \Gamma z}$$

$$\rho_\tau = \rho_o + \rho e^{j\omega t - \Gamma z}$$

$$E_\tau = E e^{j\omega t - \Gamma z - jk_s z} \cos(k_w z), \qquad (2)$$

where the subscript $v$ indicates a total including the steady state or direct-current (DC) components and $k_w$ is $2\pi$ divided by the ripple period (or wiggle period for a standard FEL). The term $jk_s z$ is included in the expression for the axial field in order to allow slippage, where $k_s$ is the slippage wave number.

The essential difference in the physics of an axial and a transverse-coupling FEL is how the beam current drives the RF mode. The transverse-coupling FEL interacts through the transverse motion of electrons. The transverse current density results only from charge-density variations during the wiggle motion; the RF velocity $v$ is axial and does not contribute to the transverse current density. However, the axial FEL interacts through the total axial RF current, $i$, defined in Eq. (2).

One relationship between ρ and E is obtained by using the continuity equation, the definition of RF current, and the Lorentz force equation (known as the electronic equation). A second relationship is obtained from the wave equation (known as the circuit equation). Integrating the Lorentz force equation over several periods also gives $k_s = -k_w$.

Setting the two relationships between E and ρ equal, the dispersion relation becomes:

$$\{(\beta_e - j\Gamma)^2 - [(j\Gamma)^2 - k^2]\hat{\beta}_q^2\}[(\Gamma - jk_w)^2 - \Gamma_1^2] - 2\beta_1^4 C^3 = 0, \qquad (3)$$

where C is Pierce's gain parameter, defined by $$C^3 = \frac{K}{2R_0} \frac{k^2 \beta_e}{k_c^2 \beta_1};$$

$R_0$ is the beam impedance; $\beta_e$ is the beam propagation constant ($\omega/V_o$); K is coupling impedance; $\beta_1$ is a mode propagation constant ($\omega/V_{phase}$), k is the free space number $\omega/c$, $k_c$ is the cutoff wave number as determined by the transverse dimensions of the waveguide ($k_c^2 = k^2 - \beta_1^2$); $\Gamma_1 = j\beta_1$; and $\hat{\beta}_q^2$ is the normalized space-charge wavenumber, $$\hat{\beta}_q^2 = 2\chi I \, \ln(r_w/r_b)/I_A \gamma^3 \beta^3, \qquad (4)$$

where $\chi$ is a geometrical factor close to unity, I is the beam current, $I_A$ is about 17 kA, $r_w$ is the wall radius, $r_b$ is the beam radius, $\gamma$ is the relativistic mass factor, and $\beta$ is the beam's axial velocity normalized to the speed of light. As noted above, the only difference between a FEL and a TWT is the coupling impedance K.

Since the dispersion relation is a quartic relation, there are four $\Gamma$ solutions, of which at most one represents a growing mode. For the solution $\Gamma$ of the dispersion relation that leads to a growing mode (real part of $\Gamma$ negative), $\Gamma$ is itself the exponential growth rate of the RF mode and the phase evolution is given by the imaginary part of $\Gamma$. Phase stability is defined by $d/dv_o\text{Im}(\Gamma)=0$.

Note that the interaction strength $2C^3\beta_1^4$ scales as $I/\gamma\beta^3$ where I is the average beam current and $\gamma(\gamma^2=1/(1-\beta^2))$ is the relativistic factor for the beam. In general, the interaction strength is a function of the beam energy; however, for most common dependencies of the current on the beam voltage the interaction strength is a weak function of the beam energy. For example, if the diode has a constant perveance, the current scales as the beam voltage to the 3/2 power. For this case the derivative of the interaction strength with respect to $\gamma$ is $$\frac{d}{d\gamma}(2C^3\beta_1^4) = 2C^3\beta_1^4\left(\frac{3}{2(\gamma-1)} - \frac{1}{\gamma} - \frac{3}{\beta^2\gamma^3}\right), \quad (5)$$

which makes $(dC/d\gamma)(\gamma-1)$ vanish if the beam is nonrelativistic, or if $\gamma\approx 1$. The ($\gamma-1$) factor appears because relative voltage fluctuations appear in the form $\delta\gamma/(\gamma-1)$.

In the absence of space charge, resonance is established when $\beta_e=\beta_1+k_w$. For small $C^3$ and the absence of space charge, the dispersion equation can be approximated by a cubic equation with roots $$\Gamma_a = j\beta_e + C\beta_1\left(\frac{\sqrt{3}}{2} + \frac{j}{2}\right); \quad (6)$$

$$\Gamma_b = j\beta_e + C\beta_1\left(-\frac{\sqrt{3}}{2} + \frac{j}{2}\right), \text{ which is the growth root;}$$

$$\Gamma_c = j\beta_e - jC\beta_1.$$

With space charge, resonance is typically established in accordance with the present invention when the beam velocity is slightly detuned, $\beta_e=\beta_1+k_w+\Delta$. Fluctuations in the beam voltage lead to changes in both $\beta_e$ and $\hat{\beta}_q^2$ (and minor changes in C), leading to a different solution $\Gamma$ of the dispersion relation. The present invention uses the detuning $\Delta$, which is adjusted by beam velocity and wall ripple spacing, and the beam-wall spacing (which changes $\hat{\beta}_q^2$), where changes in $\beta_e$ from changes in the beam velocity cancel changes in $\hat{\beta}_q^2$ in the dispersion relation, so that the solution of $\Gamma$ (from Eq. (3)) does not change, thereby establishing stability.

By adjusting both $\Delta$ and $\hat{\beta}_q^2$, both $d/dv_o\text{Re}(\Gamma)=0$ (amplitude stability) and $d/dv_o\text{Im}(\Gamma)=0$ (phase stability) can be achieved. This effect physically arises from how the RF electric field E drives changes in the RF beam density $\rho$. As the beam energy is increased, the inertia of the electrons is increased, leading to a lesser growth in the beam RF density for the same RF electric field. However, as the beam energy is increased, the opposing force from the space-charge wave is also decreased, leading to a greater growth of the RF density for the same RF electric field. By matching the amplitudes of these opposing effects (by adjusting the detuning and the beam-wall spacing), the net growth of $\rho$ due to E can be made independent of energy, thereby leading to autostability.

For the case of high energy and low gain, the following relationships can be shown to result in both amplitude and phase stability in the Raman regime by detuning:

$$\Delta=-\beta_e/\gamma=\beta_e-\beta_1-k_w, \quad (7)$$

where $\Delta$ is a detuning perturbation, $\beta_e$ and $\beta_1$ are selected electron and RF beam propagation constants, $\gamma$ and $k_w=2\pi$/spacing of wiggles are known;

$$\hat{\beta}_q^2 = \frac{2}{3\gamma(\gamma+1)(1-1/\gamma)}, \quad (8)$$

where $\hat{\beta}_q^2$ is the normalized space charge wave number and is functionally related to the ratio of the wall radius to the beam radius. These relationships are valid where the interaction strength is independent of beam energy and only make sense for $\gamma$ on the order of 10 or greater.

Figure 3A:
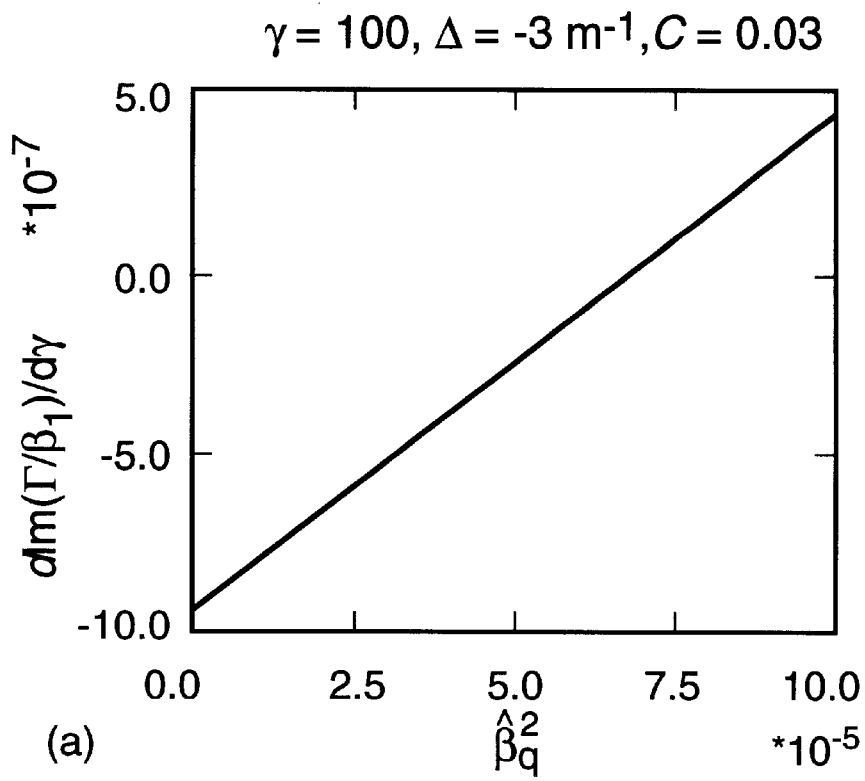
FIGS. 3A and 3B graphically depict the sensitivity of phase and of gain to beam energy as a function of space-charge wave number.
Figure 3B:
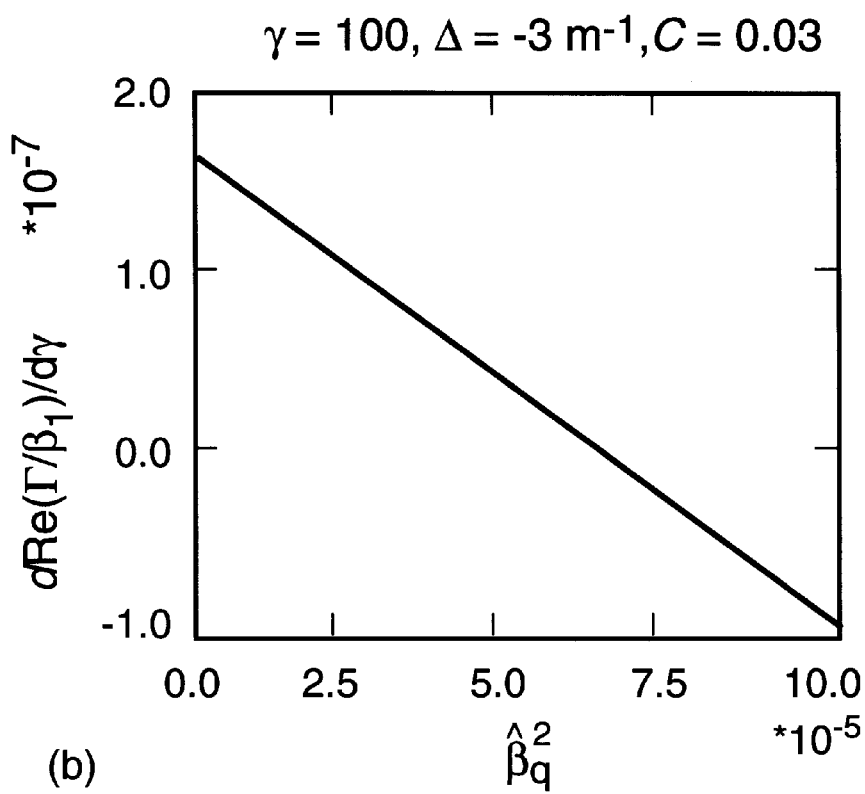

For an exemplary case, $\gamma=100$, $\beta_e=300$ m$^{-1}$, and C=0.03, this solution is given by $\Delta=-3$ m$^{-1}$ and $\hat{\beta}_q^2=6.7\times10^{-5}$. FIGS. 3A and 3B, respectively, graphically depict the derivatives of the phase change per unit length and the amplitude growth with respect to beam energy, respectively, as calculated numerically for $\Delta=-3$ m$^{-1}$ while varying $\hat{\beta}_q^2$, i.e., beam-to-wall spacing, and while assuming that the interaction strength is independent of beam energy and that the beam has constant perveance. The derivatives indicate the sensitivity of phase (FIG. 3A) and of gain (FIG. 3B), respectively, to beam energy for the low-gain, high-energy case of Eq. (8) as a function of space-charge wave number. As predicted, both derivatives are zero at $\hat{\beta}_q^2=6.7\times10^{-5}$ which is an autophase stable operating point.

If the solution in Eqs. (7) and (8) are tried for lower beam energy, say $\gamma=10$, the solution does not correspond to a growing mode (the detuning is so large it pushes the circuit admittance onto the lower branch of the electronic admittance). However, a phase stable solution does still occur [$d/dv_0\text{Im}(\Gamma)=0$] if Eq. (7) is satisfied with smaller detunings. Then, $$\hat{\beta}_q^2 = \frac{2}{3\gamma(\gamma+1)}\left\{\left(1 - \frac{b\Delta}{3(a^2+b^2)C\beta_1} - \frac{dC/d\gamma}{C}\frac{3(a^2-b^2)C\beta_1\beta^2\gamma^3}{2(a^2+b^2)^2\beta_e}\right)\middle/\left[\left(1 - \frac{\Delta}{\beta_e}\right) + \frac{b[(\beta_1+k_w)^2-k^2]}{2(a^2+b^2)C\beta_1\beta_e}\right]\right\} \quad (9)$$

where a and b are components of $\delta_0=-a+jb$, where $\delta_0=(j\beta_1+jk_w-\Gamma)/C\beta_1$ is the normalized growth parameter and a and b both are positive and typically on the order of unity. Eq. (9) reduces to Eq. (8) if the derivative of the gain parameter vanishes and if Eq. (7) is satisfied.

Consider a constant perveance case with these parameters: $\gamma=10$, C=0.015, and very small detuning. Eq. (9) predicts the proper space-charge wave number by assuming the solution for the growing mode is the small-gain, no space-charge solution given by Eq. (6) to Eq. (9), where a=$\sqrt{3}/2$ and b=½. The predicted phase-stable space-charge wave number for the zero detuning case is $\hat{\beta}_q^2=4.5\times10^{-3}$ and, for the case where Eq. (7) is satisfied, is $\hat{\beta}_q^2=5.5\times10^{-3}$.

Figure 4A:
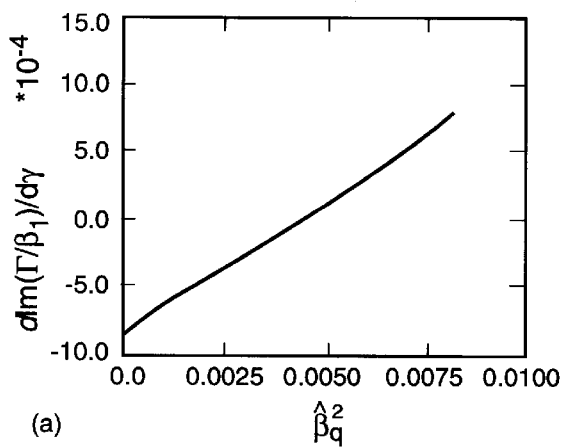
FIGS. 4A–4C graphically depicts the sensitivity to phase on beam energy for three detuning perturbations.
Figure 4C:
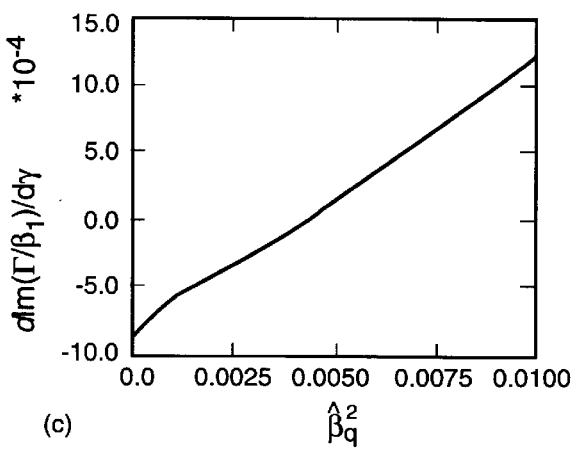
Figure 4B:
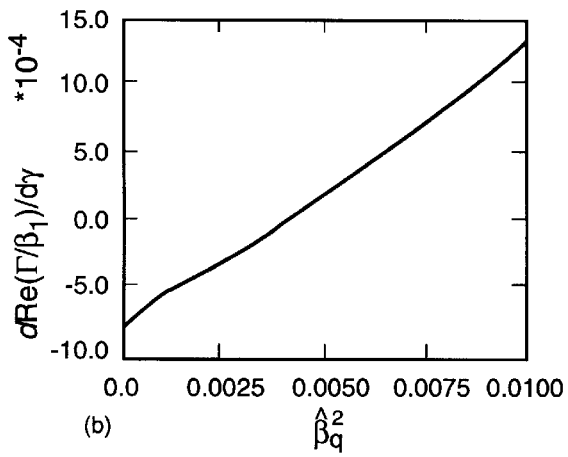

FIGS. 4A, 4B, and 4C show the derivative of the phase change per unit length as a function of $\hat{\beta}_q^2$ plotted for detunings of −2, −3.5, and −5 m$^{-1}$ respectively. In all cases the numerically calculated solution is phase stable (zero derivative value) near these predicted solutions ($\hat{\beta}_q^2\approx4.3\times10^{-3}$). For these low-gain parameters, a growing mode only exists in the presence of a space-charge wave with $\hat{\beta}_q^2\sim5\times10^{-3}$ for detunings from −2 to −5 m$^{-1}$.

Figure 4D:
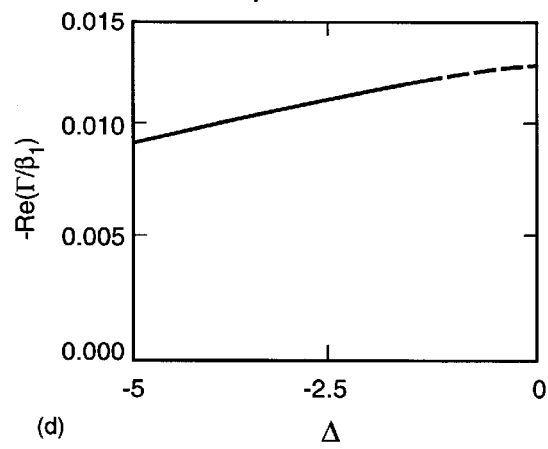
FIG. 4D graphically depicts gain as a function of detuning for the phase-stable cases shown in FIGS. 3A–C.

In FIG. 4D, the gain of the mode versus detuning is plotted for the phase stable solutions. The dashed line for detunings between 0 and −2 m$^{-1}$ indicate that no phase-stable growing mode exists for those detunings. Note that the amplitude of the growing mode is only slightly affected by the introduction of the space-charge wave. This space-charge wave number corresponds to about 500 A for the parameters $r_w$=3.6 cm and $r_b$=3.2 cm. Note also that the term in the numerator of Eq. (9) containing the derivative of the gain parameter scales as $-\gamma^3$ and becomes less than $-1$ if the gain is greater than 0.09 for $\gamma$=10, which prevents any solution for a phase-stable space-charge wave number (since $\hat{\beta}_q^2$ must be a positive number). The strong scaling with beam energy makes this phase-stability technique hard to implement for high beam energies if the gain is a function of beam energy.

Consider another constant perveance case with $\gamma$=2 at 13 GHz (so the beam propagation constant is about 300 m$^{-1}$), an output power of about 1 GW and with a device length of about 1 m. Using the definition for the interaction strength [Eq. (4)] the gain constant C is on the order of 0.1. A detuning of $\Delta$=$-50$ m$^{-1}$ is a convenient operating condition for these parameters. Assuming the low-gain, no-space-charge solution [Eq. (6)] for the constants a and b in Eq. (9), the detuning term in Eq. (9) is about 0.4, the gain parameter term is about $-0.3$ and the detuning term in the denominator is about 2.5. These values lead to phase-stable operation at a predicted space-charge wave number of about 0.08.

Figure 5:
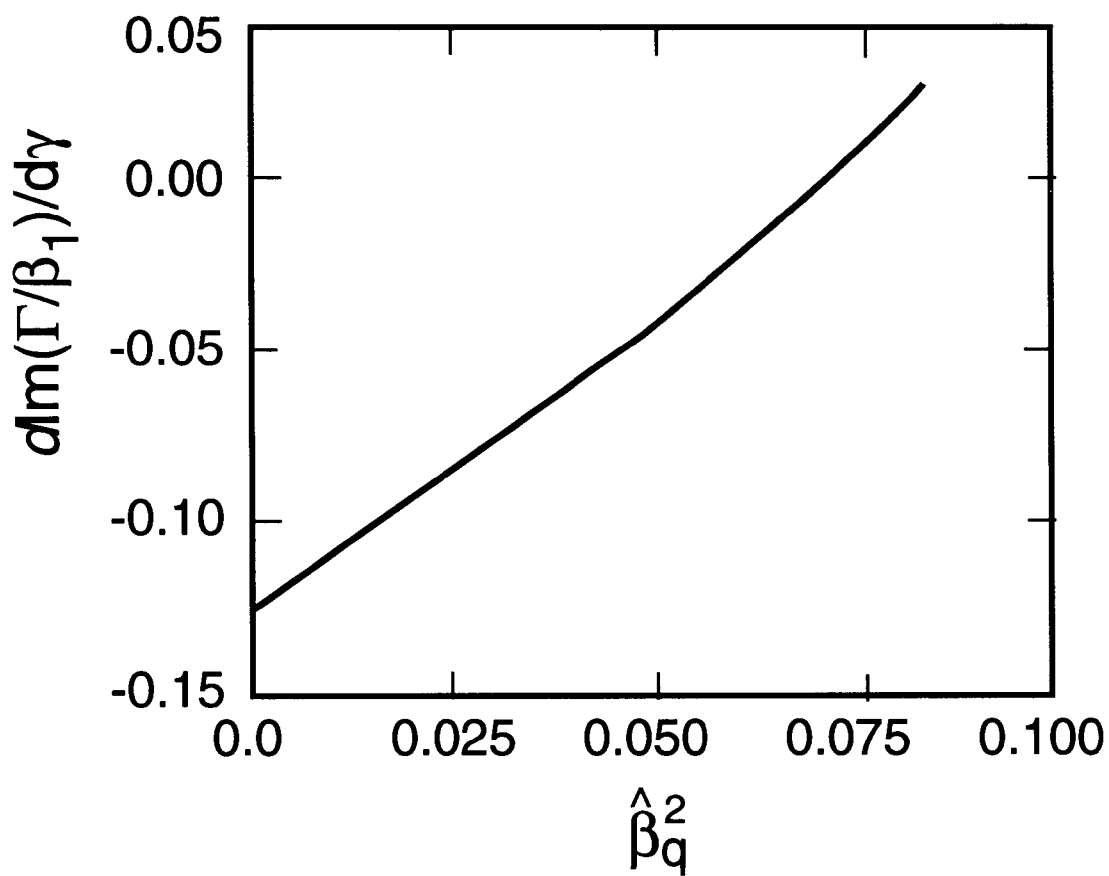
FIG. 5 graphically the sensitivity of phase to beam energy for a medium-gain, low-energy case.

This detuning is plotted in FIG. 5, which shows the derivative of the phase change per unit length with respect to beam energy as a function of the space-charge wave number numerically calculated from the dispersion relationship. The calculated growth rate is about 11 m$^{-1}$ or about a factor of 2 per wiggler period if the wiggle wave number is $k_w$=100 m$^{-1}$ (a 6 cm wiggler period), and phase-stable operation is achieved with a beam current of about 5 kA at nearly the predicted space-charge wave number. For this case the approximations used to derive Eq. (9) are marginally satisfied, but the prediction for the phase-stable space-charge wave number is still quite good.

As a final example consider the high gain case where C>1. Eq. (10) provides an estimate of the gain required to achieve phase stability in the absence of a space-charge wave($\hat{\beta}_q^2$= 0):

$$\frac{1}{2} - \frac{\beta_1}{\beta_e}\gamma^3\beta^2\frac{3}{4\times 2^{1/4}}C^{3/4}\left(\frac{dC/d\gamma}{C}\right) = 0. \quad (10)$$

For $\gamma$=2 and $(dC/d\gamma)/C$~0.17, the growing mode is phase stable near C=1.25 Eq. (10) is only strictly valid when C is much greater than unity.

A more detailed treatment of the above analysis is presented in B.E. Carlsten, "Enhanced phase stability for a Raman free-electron laser amplifier in the exponential growth regime," 2 Phys. Plasmas (10), pp. 3880–3892 (October 1995), incorporated herein by reference.

This phase-stability scheme applies generally to traveling-wave devices having off-axis electron beams; in particular, to traveling wave tubes (TWTs) 50 and 68 (FIGS. 6 and 7) and transversely wiggling FELs 82 (FIG. 8) with off-axis electron beams 58, 72, 86, respectively, in addition to the axial FELs, described above. In TWT 50, shown in FIG. 6, electron beam gum 56 produces an annular or off-axis electron beam 58 for interaction with an rf electromagnetic field, which is input at port 52 and output through port 54, and a magnetic field $\vec{B}$ produced by a current in an external solenoid (not shown). Helix 62 is a slow-wave structure that slows the rf phase velocity below the speed of light.

Figure 7:
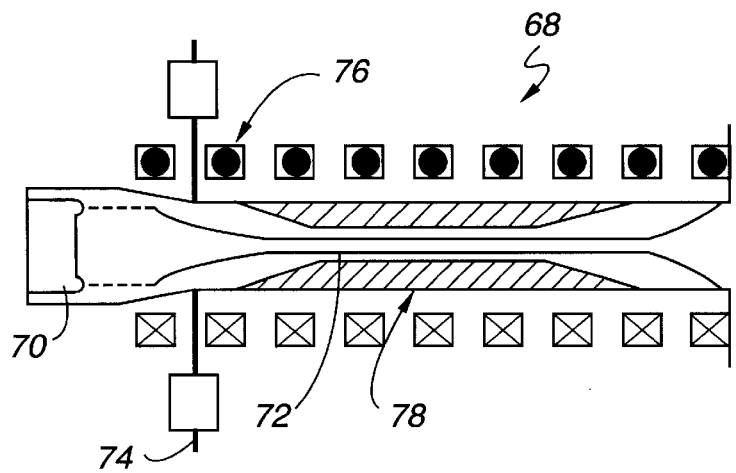
FIG. 7 is a schematic representation of a dielectric-lined traveling wave tube.

In TWT 68, shown in FIG. 7, electron beam gun 70 produces an off-axis electron beam 72 for interaction with an rf electromagnetic field input at port 74 and a magnetic field produced by current in coils and a magnetic field produced by an external coil 76. Dielectric liner 78 produces a slow-wave structure to slow the rf phase velocity below the speed of light.

Figure 6:
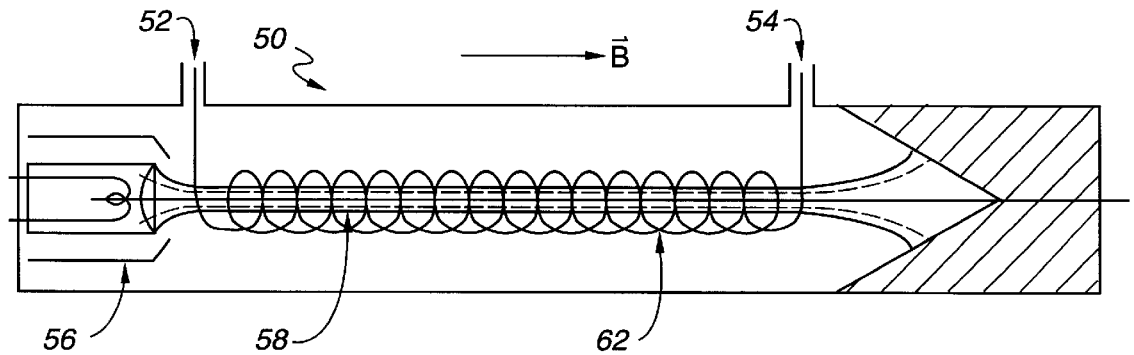
FIG. 6 is a schematic representation of a helix slow-wave structure traveling wave tube.
Figure 8:
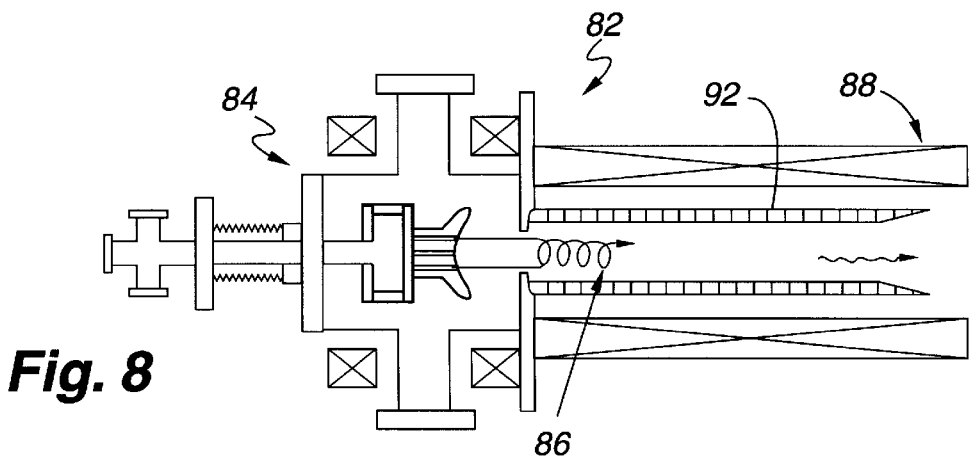
FIG. 8 is a schematic representation of a transverse FEL with a helical wiggler.

The TWT structures shown in FIGS. 6 and 7 both produce interactions that are classified as slow-wave interactions, as opposed to a fast-wave interaction in FELs. FIG. 8 more particularly depicts a transverse interaction FEL 82. Electron beam gun 84 outputs an annular or off-axis electron beam 86 for interaction with the magnetic field produced by permanent magnet wiggler 92. Solenoid 88 produces an axial magnetic field to cause rotation of electrons in electron beam 86.

The above analysis for the phase-stability criteria (Equations (2)–(10)) is still valid for a traveling-wave tube, with the modifications that the total electric field in Equation (2) is just $E_r$=$Ee^{j\omega t-\Gamma z}$, the coupling impedance term K and the gain term C are defined somewhat differently, and $k_w$ is the amount the mode's wavenumber is increased by the slow-wave structure (the mode's phase velocity in the slow-wave structure is given by $k_w$+$\beta_1$, where $\beta_1$ is the mode's unperturbed propagation constant). With these identifications, Equations (9) and (10) still describe how to achieve phase-stable operation. In practice, the same considerations are used to implement this scheme as in an axial FEL: (1) the slow-wave structure is designed such that the slowed phase velocity of the wave provides the correct detuning from the single-particle resonance, and (2) the beam-wall spacing is adjusted to obtain the desired space-charge wavenumber.

FIG. 8 shows a common representation of a transverse wiggler FEL 82 with the transverse wiggling induced by a helical wiggler magnet 92 arrangement. The above analysis for the phase-stability criteria (Equations (2)–(10)) is virtually unchanged (the coupling impedance term K and the gain term C are defined somewhat differently as with the traveling-wave case, and $k_w$ is now the wiggler wavenumber (wiggler period divided by 2 $\pi$). With these identifications, Equations (9) and (10) still describe how to achieve phase-stable operation. As with the axial FEL case, this scheme is implemented by (1) choosing the correct helix wiggle period, such that detuning is correct, and (2) adjusting the beam-wall spacing to obtain the desired space-charge wavenumber.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for providing autophase stability for a traveling wave device (TWD) electron beam for amplifying an RF electromagnetic wave in walls defining a waveguide structure having a first radius for the electromagnetic wave, comprising the steps of:

generating an off-axis electron beam at a selected energy and having inherent energy noise;

introducing a RF electromagnetic wave into the waveguide;

introducing the off-axis electron beam at a second radius in the waveguide;

providing the waveguide structure to detune the electron beam to satisfy a first relationship $$\hat{\beta}_q^2 = \frac{2}{3\gamma(\gamma+1)}\left\{\left(1 - \frac{b\Delta}{3(a^2+b^2)C\beta_1} - \frac{dC/d\gamma}{C}\frac{3(a^2-b^2)C\beta_1\beta^2\gamma^3}{2(a^2+b^2)^2\beta_e}\right)\middle/\left[\left(1-\frac{\Delta}{\beta_e}\right) + \frac{b[(\beta_1+k_w)^2 - k^2]}{2(a^2+b^2)C\beta_1\beta_{e_-}}\right]\right\},$$

where $\hat{\beta}_q^2$ is the normalized space-charge wavenumber, a and b are components of $\delta_0 = -a + jb$, where $\delta_0 = (j\beta_1 + jk_w - \Gamma)/C\beta_1$ is the normalized growth parameter and a and b both are positive and typically on the order of unity, $\Gamma$ is the growth of RF quantities (current, density, electric field, RF velocity), $\beta$ is the beam's axial velocity normalized to the speed of light, $\beta_e$ is the beam propagation constant; $\beta_1$ is a mode propagation constant, k is the free space number, $k_w = 2\pi/$spacing of wiggles, $\gamma$ is the relativistic mass factor, $\Delta$ is a detuning perturbation, and C is Pierce's gain parameter; and providing the off-axis electron beam with a velocity and with the second radius to place the electron beam a selected distance from the walls defining the waveguide structure to simultaneously provide a normalized space charge wavenumber $\hat{\beta}_q^2$ that simultaneously satisfies the first relationship and a second relationship $$\hat{\beta}_q^2 = 2\chi I \, ln(r_w/r_b)/I_A\gamma^3\beta^3,$$

where $\chi$ is a geometrical factor close to unity, I is the beam current, $I_A$ is about 17 kA, $r_w$ is the wall radius, and $r_b$ is the beam radius, wherein changes in a density of the electron beam due to the RF electromagnetic wave are independent of the energy of the electron beam with a concomitant stable operating regime relative to the energy noise.

2. A method according to claim 1, wherein the TWD is an axial-interaction FEL and further including the step of providing the waveguide structure as a rippled waveguide for the RF field to wiggle a null position of the RF field about the electron beam.

3. A method according to claim 1, wherein the TWD is a transverse interaction FEL and further including the step of providing the waveguide structure as a magnetic field wiggler to wiggle the electron beam about the RF field at a wiggle wavenumber to satisfy the first relationship.

4. A method according to claim 1, wherein the TWD is a TWT and further including the step of providing the waveguide structure as a slow wave structure defining a wavenumber effective to satisfy the first relationship.

5. A method according to claim 4, wherein the TWD is a TWT and further including the step of providing the slow wave structure as a dielectric liner.

6. A method according to claim 1, wherein the off-axis electron beam is an annular beam.

7. A method according to claim 6, wherein the TWD is a transverse interaction FEL and further including the step of providing the waveguide structure as a magnetic field wiggler to wiggle the electron beam about the RF field at a wiggle wavenumber to satisfy the first relationship.

8. A method according to claim 6, wherein the TWD is a TWT and further including the step of providing the waveguide structure as a slow wave structure defining a wavenumber effective to satisfy the first relationship.

9. A method according to claim 8, wherein the TWD is a TWT and further including the step of providing the slow wave structure as a dielectric liner.

* * * * *